United States Patent
Hsu (10) Patent No.: US 10,779,678 B2
(45) Date of Patent: Sep. 22, 2020

(54) AUTOMATIC HANDMADE DRINK BREWING PACKING EQUIPMENT

(71) Applicant: Wei-Hsiang Hsu, Taichung (TW)

(72) Inventor: Wei-Hsiang Hsu, Taichung (TW)

( * ) Notice: Subject to any disclaimer, the term of this patent is extended or adjusted under 35 U.S.C. 154(b) by 532 days.

(21) Appl. No.: 15/611,550

(22) Filed: Jun. 1, 2017

(65) Prior Publication Data
US 2018/0344073 A1 Dec. 6, 2018

(51) Int. Cl.
*A47J 31/40* (2006.01)
*A47J 31/41* (2006.01)
*A47J 31/44* (2006.01)

(52) U.S. Cl.
CPC .......... *A47J 31/401* (2013.01); *A47J 31/402* (2013.01); *A47J 31/404* (2013.01); *A47J 31/41* (2013.01); *A47J 31/44* (2013.01)

(58) Field of Classification Search
CPC ....... A47J 31/401–404; A47J 31/41–44; A47L 15/247; A47F 10/00; A47F 2010/005; A47F 7/28; A47F 7/0021; B67C 9/00; B67D 3/00
See application file for complete search history.

(56) References Cited

U.S. PATENT DOCUMENTS

| | | | | |
|---|---|---|---|---|
| 4,790,239 A | * | 12/1988 | Hewitt | A47J 31/007 99/279 |
| 7,207,359 B2 | * | 4/2007 | Duman | B65B 43/52 141/129 |
| 2011/0017776 A1 | * | 1/2011 | Metropulos | B67D 1/0041 222/129.1 |
| 2012/0285986 A1 | * | 11/2012 | Irvin | B67D 1/0041 222/1 |
| 2013/0010568 A1 | * | 1/2013 | Bodum | A47J 31/00 366/130 |
| 2014/0370181 A1 | * | 12/2014 | Young | A23F 5/02 426/595 |
| 2015/0136991 A1 | * | 5/2015 | van der Velden | G01S 17/04 250/349 |
| 2016/0360919 A1 | * | 12/2016 | Burrows | A47J 31/407 |
| 2018/0332697 A1 | * | 11/2018 | Bazargan | G01J 3/42 |

* cited by examiner

*Primary Examiner* — Ibrahime A Abraham
*Assistant Examiner* — William C. Gibson (57) ABSTRACT

An automatic handmade drink brewing packing equipment contains: a delivery unit, an ordering unit, a material preparation unit, a drink cup unit, a storage unit, a seasoning unit, a stirring unit, and an automatic capping unit. The delivery unit includes a rail on which a dropping area, a material supply area, a first flavoring area, a first mixing area, a packaging area, and a sales area are arranged. The ordering unit includes a display screen and a central controller. The material preparation unit includes an automatic control device and multiple accommodation tanks. The drink cup unit includes multiple cup holders and drink cups. The storage unit includes plural storing tanks and control valves. The seasoning unit includes plural first flavoring buckets and second flavoring buckets. The stirring unit includes a first stirrer and a first power member. The automatic capping unit includes a sealing machine.

9 Claims, 6 Drawing Sheets

```
┌─────────────────────────┐  ┌──────────────────────────────┐
│ The material preparation│  │ The ordering unit sets types │
│ unit boils tea in       │  │ the types of the drinks and  │
│ advance and pumps       │  │ the flavorings, the quantites│
│ boiled water into       │  │ of the sugars and the ice    │
│ multiple accommodation  │  │ cubes, and adding of the     │
│ tanks.                  │  │ extra materials.             │
└─────────────────────────┘  └──────────────────────────────┘
```

The central controller starts the delivery unit and drops the multiple drink cups on the dropping area.

↓

The multiple drink cups are conveyed to the material supply area so as to feed the boiled water into the multiple drink cups.

↓

The multiple drink cups are delivered to at least one flavoring area so as to feed the flavorings into the multiple drink cups.

↓

The multiple drink cups are delivered to at least one mixing area so as to extend at least one stirrer into the multiple drink cups after at least one power member drives the at least one stirrer, thus mixing the boiled water and the flavorings together.

← The material adding unit adds extra materials.

↓

The multiple drink cups are conveyed to the packaging area so as to be sealed.

↓

The multiple drink cups are delivered to the sales area, after being packaged.

AUTOMATIC HANDMADE DRINK BREWING PACKING EQUIPMENT

BACKGROUND OF THE INVENTION

1. Technical Field

The present invention relates to an automatic brewing device, and more particularly to automatic handmade drink brewing packing equipment which is operated easily and hygienically.

2. Description of Related Art

Everyone knows handmade drink in Taiwan, especially pearl milk tea is well known, also become one of the most representative drinks and snacks. Handmade drink has been popular from Taiwan to East Asia, Europe, the United States and even countries in the Middle East and other places.

Making a handmade drink is to pour tea, syrup, and ice cubes into a shake cup and to manually shake the shake cup quickly with two hands, but the two hands will injure easily.

To avoid injuring the two hands, the shake cup is mounted on a drink making machine and is shaken automatically. However, materials (such as sugars, the ice cubes, creamers, tapioca pearls, jellies, and passion fruit jams, etc.) are added into the shake cup by an operator troublesomely.

The present invention has arisen to mitigate and/or obviate the afore-described disadvantages.

SUMMARY OF THE INVENTION

The primary objective of the present invention is to provide automatic handmade drink brewing packing equipment which is operated easily and hygienically.

Another objective of the present invention is to provide automatic handmade drink brewing packing equipment which is operated at a low labor cost.

To obtain the above objectives, automatic handmade drink brewing packing equipment provided by the present invention contains: a delivery unit, an ordering unit, a material preparation unit, a drink cup unit, a storage unit, a seasoning unit, a stirring unit, and an automatic capping unit.

The delivery unit includes a rail on which a dropping area, a material supply area, a first flavoring area, a first mixing area, a packaging area, and a sales area are arranged.

The ordering unit is located in the sales area of the delivery unit and includes a display screen by which a tea brewing process is manually set, and the ordering unit includes a central controller configured to programmably control types, quantities, tastes, and sweetness of drinks in the tea brewing process.

The material preparation unit includes an automatic control device configured to execute brewing of materials at fixed time and temperature, and the material preparation unit also includes multiple accommodation tanks, each of which is configured to accommodate the materials.

The drink cup unit is located in the dropping area of the delivery unit and includes a plurality of cup holders and multiple drink cups held in the plurality of cup holders respectively, wherein as starting the tea brewing process, and the multiple drink cups drop on the dropping area of the rail.

The storage unit is located in the material supply area of the delivery unit and includes plural storing tanks connecting with the multiple accommodation tanks individually, and the storage unit includes a plurality of control valves, each of which is connected with each of the multiple accommodation tanks and each of the plural storing tanks, such that the materials in each accommodation tank are pumped into each storing tank by using each control valve, and the multiple drink cups are conveyed to the material supply area from the dropping area along the rail so as to feed the materials into the multiple drink cups.

The seasoning unit is located in the first flavoring area of the delivery unit and includes plural first flavoring buckets which are configured to accommodate flavorings, and the multiple drink cups are conveyed to the first flavoring area from the material supply area along the rail so as to feed the flavorings into the multiple drink cups.

The stirring unit is located in the first mixing area and includes a first stirrer and a first power member connected with the first stirrer, wherein the multiple drink cups are delivered to the first mixing area from the first flavoring area so that the first stirrer extends into the multiple drink cups after the first power member drives the first stirrer, thus mixing the material and the flavorings together.

The automatic capping unit is located in the packaging area of the delivery unit and includes a sealing machine, wherein when the multiple drink cups are conveyed to the packaging area, the sealing machine seals the multiple drink cups, and the multiple drink cups are delivered to the sales area of the delivery unit from the packaging area.

Thereby, the automatic drink brewing packing equipment of the present invention is operated circularly, automatically, easily, hygienically. Preferably, the automatic control device controls the material preparation unit to execute the tea brewing process in advance. The automatic drink brewing packing equipment is operated by a single operator to brew teas in public so as to obtain hygiene and transparent purpose.

DETAILED DESCRIPTION OF THE PREFERRED EMBODIMENTS

Figure 1:
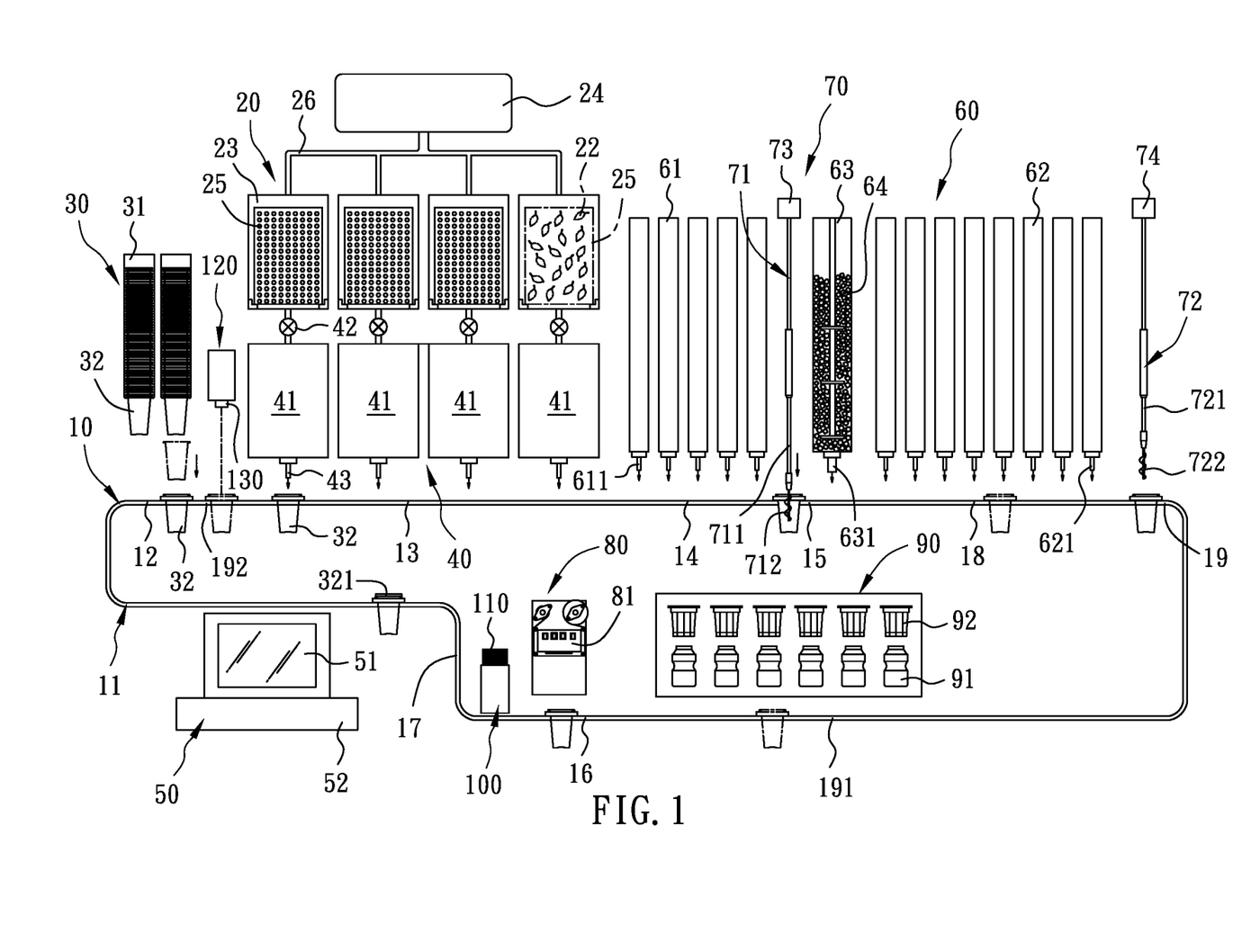
FIG. 1 is a schematic view showing the assembly of automatic handmade drink brewing packing equipment according to a preferred embodiment of the present invention.
Figure 2:
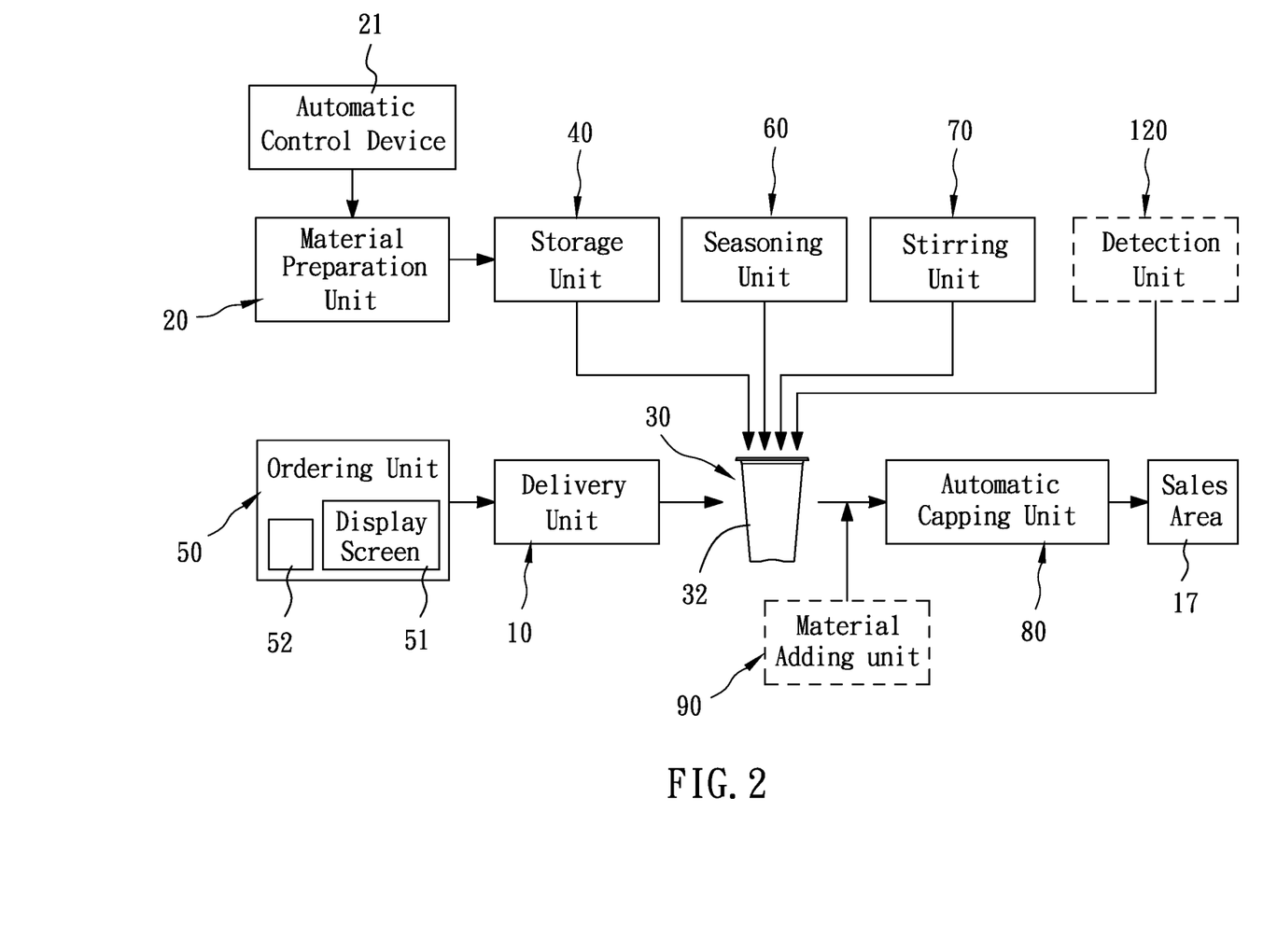
FIG. 2 is a block diagram showing the operation of the automatic handmade drink brewing packing equipment according to the preferred embodiment of the present invention.

With reference to FIGS. 1 and 2, automatic handmade drink brewing packing equipment according to a preferred embodiment of the present invention comprises: a delivery unit 10, a material preparation unit 20, a drink cup unit 30, a storage unit 40, an ordering unit 50, a seasoning unit 60, a stirring unit 70, and an automatic capping unit 80.

The delivery unit 10 includes a rail 11 on which a dropping area 12, a material supply area 13, a first flavoring area 14, a first mixing area 15, a second flavoring area 18, a second mixing area 19, a packaging area 16, and a sales area 17 are arranged.

Figure 4:
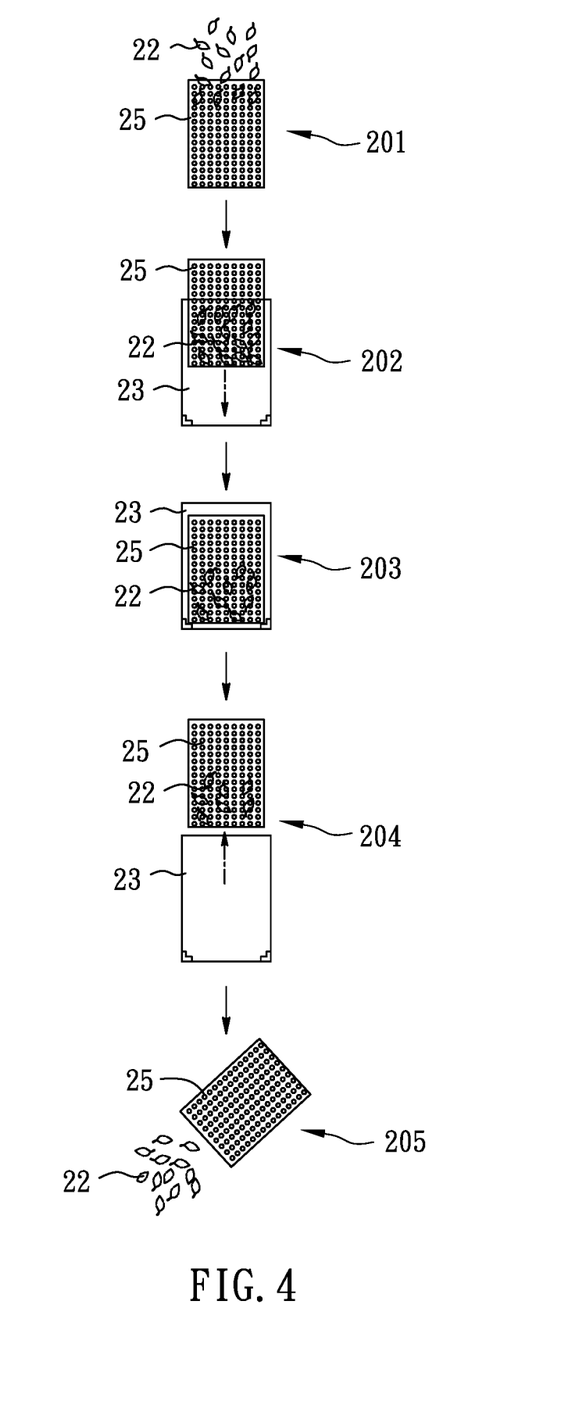
FIG. 4 is a schematic view showing the operation of an automatic control device of the automatic handmade drink brewing packing equipment according to the preferred embodiment of the present invention.

The material preparation unit 20 includes an automatic control device 21 configured to execute brewing of materials 22 at fixed time and temperature, and the material preparation unit 20 also includes multiple accommodation tanks 23, each of which is configured to accommodate the materials 22. In this embodiment, the materials 22 are tea leaves. The material preparation unit 20 further includes a heater 24 and multiple housing parts 25, wherein the heater 24 is a heating bucket and is connected with the multiple accommodation tanks 23 via a conduit 26 so as to pump boiled water into the multiple accommodation tanks 23, and the multiple housing parts 25 accommodate the materials 22 and are soaked in the multiple accommodation tanks 23 respectively by using the automatic control device 21, wherein the materials 22 are soaked in the boiled water at the fixed time and temperature so as to release theophylline. After few minutes, the multiple accommodation tanks 23 are removed so as to finish tea brewing process (i.e. the materials become drinks). As shown in FIG. 1, the material preparation unit 20 includes four accommodation tanks 23 so as to brew teas (such as green teas, black teas, oolong teas, and celadon teas) individually. In addition, the automatic control device 21 controls the martial preparation unit 20 to execute the tea brewing process. As illustrated in FIG. 4, in a first step 201, the materials (e.g. the tea leaves) 22 are poured into the multiple housing parts 25 respectively; in a second step 202, the multiple housing parts 25 are soaked in the multiple accommodation tanks 23 individually; in a third step 203, the materials 22 are soaked at the fixed time and temperature; in a fourth step 204, the multiple housing parts 25 are removed from the multiple accommodation tanks 23 respectively; in a fifth step, the materials (the tea leaves) 22 are poured out of the multiple housing parts 25 individually.

The drink cup unit 30 is located in the dropping area 12 of the delivery unit 10 and includes a plurality of cup holders 31 and multiple drink cups 32 held in the plurality of cup holders 31 respectively, wherein as starting the tea brewing process, the multiple drink cups 32 drop on the dropping area 12 of the rail 11.

The storage unit 40 is located in the material supply area 13 of the delivery unit 10 and includes plural storing tanks 41 connecting with the multiple accommodation tanks 23 individually, and the storage unit 40 includes a plurality of control valves 42, each of which is connected with each accommodation tank 23 and each of the plural storing tanks 41, such that the materials in each accommodation tank 23 are pumped into each storing tank 41 by using each control valve 42, and the multiple drink cups 32 are conveyed to the material supply area 13 from the dropping area 12 along the rail 11 so as to feed the teas into the multiple drink cups.

The ordering unit 50 is located in the sales area 17 of the delivery unit 10 and includes a display screen 51 by which the tea brewing process is manually set, and the ordering unit 50 includes a central controller 52 configured to programmably control types, quantities, tastes, and sweetness of the drinks in the tea brewing process.

The seasoning unit 60 is located in the first flavoring area 14 of the delivery unit 10 and includes plural first flavoring buckets 61 and plural second flavoring buckets 62 which are all configured to accommodate various flavorings, and the seasoning unit 60 includes an ice bucket 63, the multiple drink cups 32 are conveyed to the first flavoring area 14 from the material supply area 13 along the rail 11 so as to feed the flavorings into the multiple drink cups 32. Each of the plural first flavoring buckets 61 has a first outlet 611 configured to output the flavorings, each of the plural second flavoring buckets 62 has a second outlet 611 configured to output the flavorings, and the ice bucket 63 has a third outlet 631 configured to output ice cubes 64. As illustrated in FIG. 1, the plural first flavoring buckets 61 are arranged adjacent to the rail 11 and are located in the first flavoring area 14, and the plural first flavoring buckets 61 accommodate powdery flavorings, such as sugars, creamers, cocoa powders, and matcha powders. The plural second flavoring buckets 62 are arranged adjacent to the rail 11 and are located in the second flavoring area 18, and the plural second flavoring buckets 62 accommodate liquid flavorings, such as black sugar water, honey water, fresh milk, ginger tea, kumquat juice, lemon juice, passion fruit juice, peach juice, mango juice, Hokkaido jam, Nata de coco, and/or tapioca pearls. The ice bucket 63 is fixed among the plural first flavoring buckets 61 and the plural second flavoring buckets 62 and is configured to accommodate the ice cubes 64.

Figure 5:
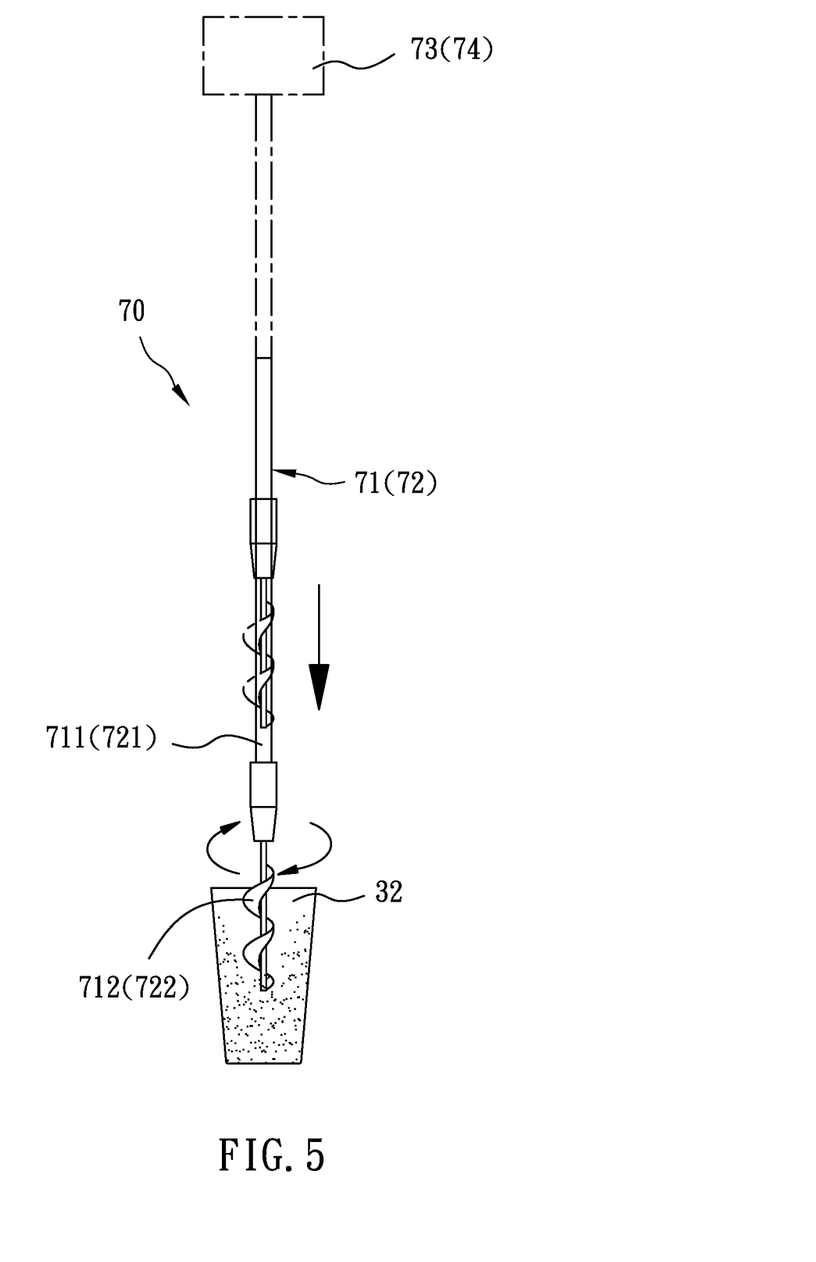
FIG. 5 is a schematic view showing the operation of a stirring unit of the automatic handmade drink brewing packing equipment according to the preferred embodiment of the present invention.

Referring to FIG. 5, the stirring unit 70 includes a first stirrer 71, a second stirrer 72, a first power member 73 connected with the first stirrer 71, and a second power member 74 coupled with the second stirrer 74. The first stirrer 71 is located in the first mixing area 15 of the delivery unit 10, and the second stirrer 72 is located in the second mixing area 19 of the delivery unit 10. The multiple drink cups 32 are delivered to the first mixing area 15 from the first flavoring area 14 so that the first stirrer 71 extends into the multiple drink cups 32 after the first power member 73 drives the first stirrer 71, thus mixing the material and the flavorings together. After the ice cubes 64 and the liquid flavorings are added into the multiple drink cups 32, the multiple drink cups 32 are delivered to the second mixing area 19. Thereafter, the second stirrer 72 extends into the multiple drink cups 32 after the second power member 74 drives the second stirrer 72 so that the ice cubes 64 and the liquid flavorings in the multiple drink cups 32 are mixed by the second stirrer 72. The first stirrer 71 has a first movable stem 711 and a first impeller 712 mounted on a front end of the first movable stem 711, and the second stirrer 72 has a second movable stem 721 and a second impeller 722 secured on a front end of the second movable stem 721.

Figure 6:
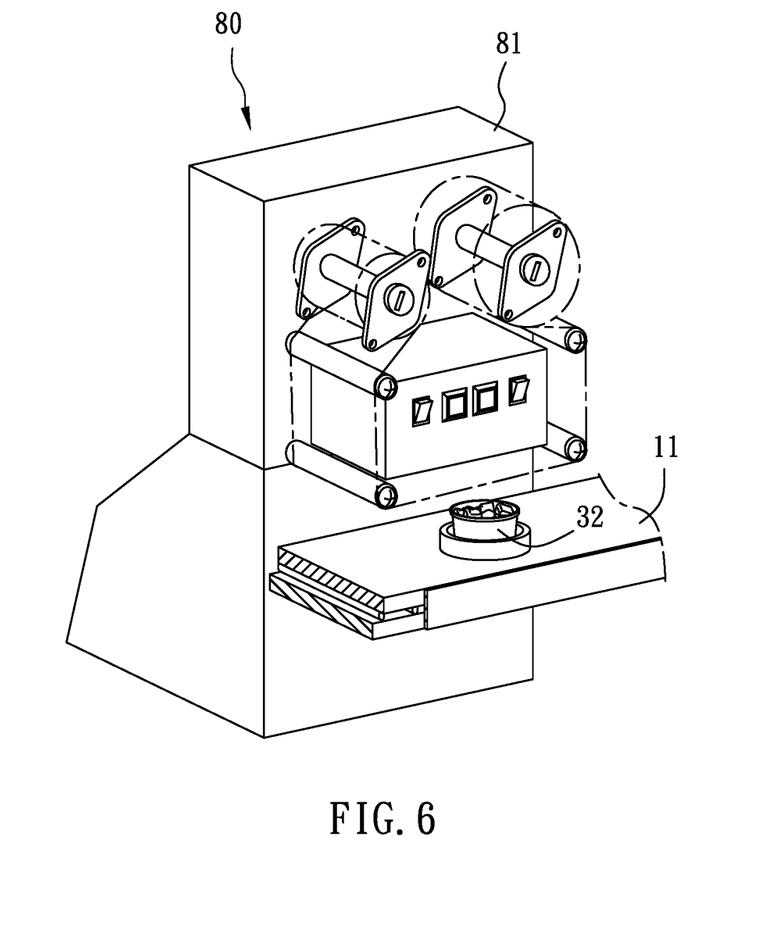
FIG. 6 is a perspective view showing the operation of an automatic capping unit of the automatic handmade drink brewing packing equipment according to the preferred embodiment of the present invention.

With reference to FIG. 6, the automatic capping unit 80 is located in the packaging area 16 of the delivery unit 10 and includes a sealing machine 81, wherein when the multiple drink cups 32 are conveyed to the packaging area 16 from the second mixing area 19 via the rail 11, the sealing machine 81 seals the multiple drink cups 32 so that each of the multiple drink cups 32 has a capping element 321 (i.e. a sealing film as shown in FIG. 1). Thereafter, the multiple drink cups 32 are delivered to the sales area 17 of the delivery unit 10.

The automatic handmade drink brewing packing equipment further comprises a material adding unit 90, and the rail 11 has a feeding area 191 defined between the first flavoring area 14 and the packaging area 16. The feeding area 191 has extra materials, such as multiple yogurts 91 and multiple yakults and puddings 92, wherein the multiple yakults or the puddings 92 are added into the multiple drink cups 32 when the multiple drink cups 32 pass through the material adding unit 90.

The automatic handmade drink brewing packing equipment further comprises a straw unit 100 located in the sales area 17 of the delivery unit 10, and the straw unit 100 has a plurality of drinking straws 110.

Referring to FIGS. 1 and 2, before starting the tea brewing process, the material preparation unit 20 provides the black teas, the green teas, the celadon teas, and the oolong teas to the four accommodation tanks 23 respectively in an automatic tea boiling mode, and the material preparation unit 20 supplements the black teas, the green teas, the celadon teas, and the oolong teas to four storing tanks 41 individually.

Figure 3:
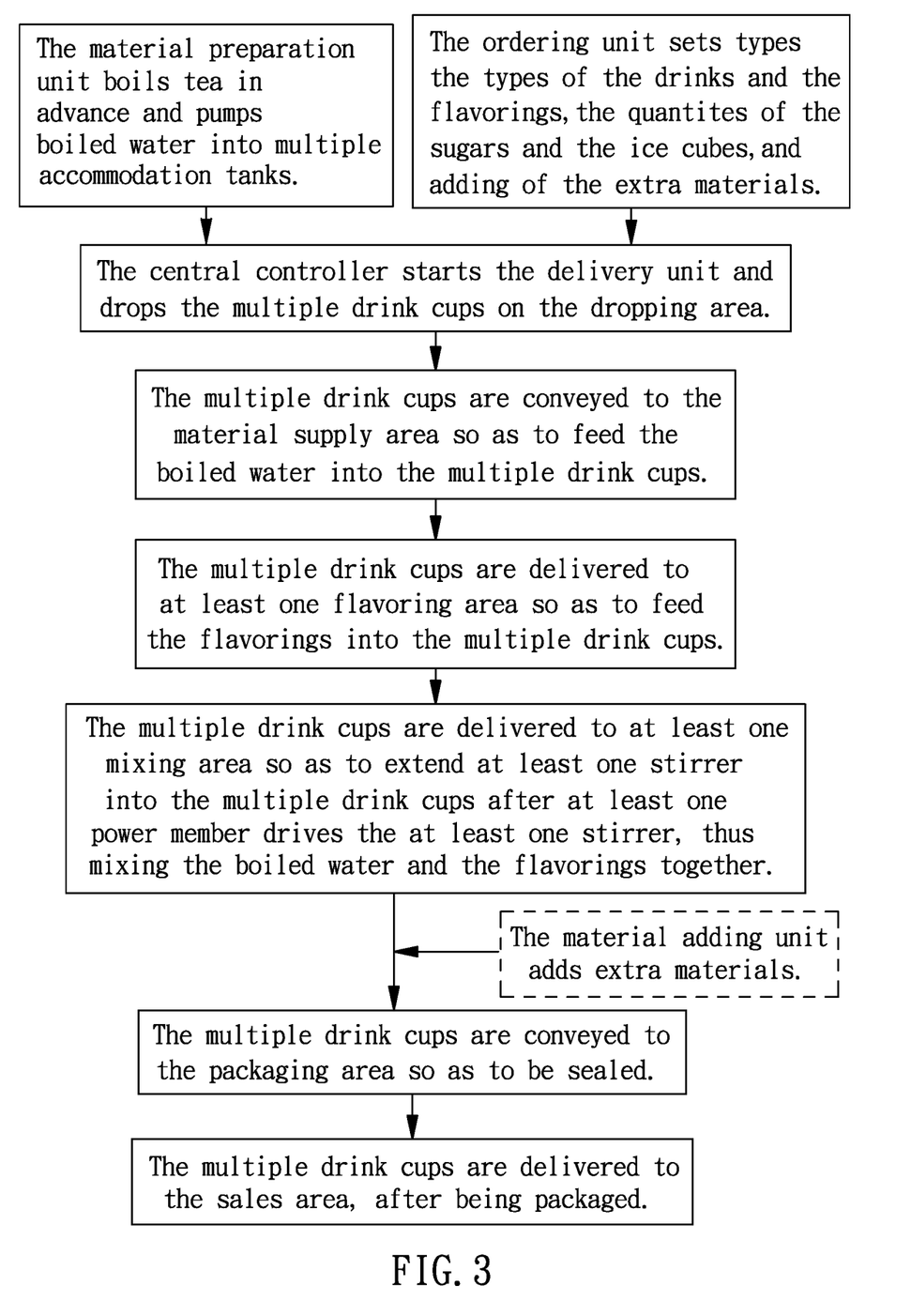
FIG. 3 is a flow chart showing the operation of the automatic handmade drink brewing packing equipment according to the preferred embodiment of the present invention.

As illustrated in FIG. 3, as starting the tea brewing process, an operator operates the ordering unit 50 on the display screen 51 so as to set types of the drinks and the flavorings and quantities of the sugars and the ice cubes 64. The ordering unit 50 starts the delivery unit 10 to deliver the multiple drink cups 32 to drop on the dropping area 12 of the rail 11 from the plurality of cup holders 31, and the multiple drink cups 32 are conveyed below one of the four storing tanks 41, then the boiled water is fed into the multiple drink cups 32 from an opening 43 of each storing tank 41, the multiple drink cups 32 are further delivered to the first flavoring area 14 so as to add the sugars, the creamers, the cocoa powders, and the matcha powders into the multiple drink cups 32. Thereafter, the multiple drink cups 32 are transported to the first mixing area 15, wherein the first stirrer 71 extends into the multiple drink cups 32 and is driven by the first power member 73 to stir the powdery flavorings and the boiled water in the multiple drink cups 32, and the multiple drink cups 32 are moved below the ice bucket 63 so as to add the ice cubes 64 into the multiple drink cups 32 from the ice bucket 63. The multiple drink cups 32 are conveyed to the second flavoring area 18 so as to add at least one of the black sugar water, the honey water, the fresh milk, the ginger tea, the kumquat juice, the lemon juice, the passion fruit juice, the peach juice, the mango juice, the Hokkaido jam, the Nata de coco, and tapioca pearls into the multiple drink cups 32. Thereafter, the multiple drink cups 32 are delivered to the second mixing area 19 so that the second stirrer 72 extends into the multiple drink cups 32 and is driven by the second power member 74 to stir the liquid flavorings in the multiple drink cups 32. As adding the liquid flavorings into the multiple drink cups 32 is not required, the multiple drink cups 32 do not stop and are not stirred in the second mixing area 19, and the multiple drink cups 32 are delivered to the packaging area 16 so as to be closed by the sealing machine 81, thereafter the multiple drink cups 32 are conveyed to the sales area 17. As adding the liquid flavorings into the multiple drink cups 32, the multiple drink cups 32 stop in the second mixing area 19 so as to add the multiple yogurts 91 or puddings 92 into the multiple drink cups 32.

The automatic handmade drink brewing packing equipment further comprises a detection unit 120, the rail 10 has a detecting area 192 defined between the dropping area 12 and the material supply area 13, and the detection unit 120 is located in the detecting area 192 and includes a charge-coupled device (CCD) 130 configured to detect the multiple drink cups 32. When the multiple drink cups 32 are conveyed into the detecting area 192 from the dropping area 12, the CCD 130 detects if foreign substances exit in the multiple drink cups 32, wherein when the foreign substances are detected by the CCD 130, the delivery unit 10 stops so that the operator inspects the automatic handmade drink brewing packing equipment.

Accordingly, the operator boils teas in advance by way of the automatic control device 21 and supplements the black teas, the green teas, the celadon teas, and the oolong teas to four storing tanks 41 individually. After a consumer orders the drinks, the operator operates the ordering unit 50 on the display screen 51 so as to set the types of the drinks and the flavorings, the quantities of the sugars and the ice cubes, and adding of the extra materials, thus brewing the drinks quickly and automatically at a low labor cost and obtaining hygiene purpose. Preferably, the stirring unit 70 stirs the powdery flavorings and the liquid flavorings evenly. In addition, the automatic handmade drink brewing packing equipment further comprises a vending system (not shown) arranged thereon so that the consumer inserts coins and operates the automatic handmade drink brewing packing equipment.

Preferably, the automatic handmade drink brewing packing equipment brews the drinks quickly and at required flavoring ratio.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:
1. An automatic handmade drink brewing packing equipment comprising:
   a delivery unit including a rail on which a dropping area, a material supply area, a first flavoring area, a first mixing area, a packaging area, and a sales area are arranged;
   wherein an ordering unit is located in the sales area of the delivery unit and includes a display screen by which a tea brewing process is manually set, and the ordering unit includes a central controller configured to programmably control types, quantities, tastes, and sweetness of drinks in the tea brewing process;
   wherein a material preparation unit includes an automatic controller configured to control brewing of materials at fixed time and temperature, and the material preparation unit also includes multiple accommodation tanks, each of which is configured to accommodate the materials;
   wherein a drink cup unit is located in the dropping area of the delivery unit and includes a plurality of cup holders and multiple drink cups held in the plurality of cup holders respectively, wherein as boiling the tea, the multiple drink cups drop on the dropping area of the rail;
   wherein a storage unit is located in the material supply area of the delivery unit and includes plural storing tanks connecting with the multiple accommodation tanks individually, and the storage unit includes a plurality of control valves, each of which is connected with each of the multiple accommodation tanks and each of the plural storing tanks, such that the materials in each accommodation tank are flowed into each storing tank by using each control valve, and the multiple drink cups are conveyed to the material supply area from the dropping area along the rail so as to feed the materials into the multiple drink cups;
   wherein a seasoning unit is located in the first flavoring area of the delivery unit and includes plural first flavoring buckets which are configured to accommodate various flavorings, and the multiple drink cups are conveyed to the first flavoring area from the material supply area along the rail so as to feed the flavorings into the multiple drink cups;

wherein a stirring unit is located in the first mixing area and includes a first stirrer and a first power member connected with the first stirrer, wherein the multiple drink cups are delivered to the first mixing area from the first flavoring area so that the first stirrer extends into the multiple drink cups after the first power member drives the first stirrer, thus mixing the material and the flavorings together; and wherein an automatic capping unit is located in the packaging area of the delivery unit and includes a sealing machine, wherein when the multiple drink cups are conveyed to the packaging area, the sealing machine seals the multiple drink cups, and the multiple drink cups are delivered to the sales area of the delivery unit from the packaging area;

wherein the stirring unit further includes a second stirrer, and the seasoning unit includes plural second flavoring buckets and an ice bucket, wherein the plural first flavoring buckets accommodate powdery flavorings, the plural second flavoring buckets accommodate liquid flavorings, and the ice bucket accommodates ice cubes, the plural first flavoring buckets are arranged adjacent to the rail, the plural second flavoring buckets are arranged adjacent to the rail, and the ice bucket is fixed among the plural first flavoring buckets and the plural second flavoring buckets, wherein the first stirrer is located among the plural first flavoring buckets and the ice bucket, and the second stirrer is located beside a last one of the plural second flavoring buckets.

2. The automatic handmade drink brewing packing equipment as claimed in claim 1, wherein the material preparation unit further includes multiple housing parts which are soaked in the multiple accommodation tanks respectively by using the automatic controller.

3. The automatic handmade drink brewing packing equipment as claimed in claim 1 further comprising a material adding unit, the rail having a feeding area defined between the first flavoring area and the packaging area, and the material adding unit being located in the feeding area.

4. The automatic handmade drink brewing packing equipment as claimed in claim 1, wherein the multiple accommodation tanks of the material preparation unit and the plural storing tanks of the storage unit are connected via a conduit on which the plurality of control valves are coupled.

5. The automatic handmade drink brewing packing equipment as claimed in claim 1, wherein the material preparation unit further includes a heater configured to supply boiled water and connected with the multiple accommodation tanks via a conduit so as to pump the boiled water into the multiple accommodation tanks.

6. The automatic handmade drink brewing packing equipment as claimed in claim 1 further comprising a straw unit located in the sales area of the delivery unit, and the straw unit having a plurality of drinking straws.

7. The automatic handmade drink brewing packing equipment as claimed in claim 1 further comprising a detection unit, the rail further having a detecting area defined between the dropping area and the material supply area, and the detection unit being located in the detecting area and including a charge-coupled device (CCD) configured to detect the multiple drink cups.

8. The automatic handmade drink brewing packing equipment as claimed in claim 1, wherein a boiled water is fed into the multiple drink cups from an opening of each storing tank.

9. The automatic handmade drink brewing packing equipment as claimed in claim 1, the first stirrer has a first movable stem and a first impeller mounted on a front end of the first movable stem, and the second stirrer has a second movable stem and a second impeller secured on a front end of the second movable stem.

* * * * *